(12) United States Patent
Morita

(10) Patent No.: US 8,275,220 B2
(45) Date of Patent: Sep. 25, 2012

(54) IMAGE PROCESSING APPARATUS, IMAGE PROCESSING METHOD, AND STORAGE MEDIUM STORING COMPUTER PROGRAM FOR IMAGE AREA SEPARATION PROCESSING

(75) Inventor: Naoya Morita, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 1001 days.

(21) Appl. No.: 12/289,497

(22) Filed: Oct. 29, 2008

(65) Prior Publication Data

US 2009/0110311 A1 Apr. 30, 2009

(30) Foreign Application Priority Data

Oct. 31, 2007 (JP) ................. 2007-284040

(51) Int. Cl.
*G06F 13/00* (2006.01)
(52) U.S. Cl. ........................ 382/305; 711/171
(58) Field of Classification Search .................. 382/305; 358/404; 711/147, 154, 171
See application file for complete search history.

(56) References Cited

U.S. PATENT DOCUMENTS

| 6,490,669 B1* | 12/2002 | Yabe .......................... 711/171 |
| 2003/0163328 A1* | 8/2003 | Rambo et al. ............... 704/500 |
| 2007/0206788 A1 | 9/2007 | Hagiwara et al. ............. 380/37 |

FOREIGN PATENT DOCUMENTS

| JP | 09-055853 A | 2/1997 |
| JP | 2003-169221 A | 6/2003 |
| JP | 2007-096695 A | 4/2007 |

OTHER PUBLICATIONS

Office Action for corresponding Japanese Application No. 2007-284040 dated Jun. 14, 2011.

* cited by examiner

*Primary Examiner* — Andrew W Johns
(74) *Attorney, Agent, or Firm* — Harness, Dickey & Pierce, P.L.C.

(57) ABSTRACT

An image processing apparatus includes an image area separation device, a compression device, an image storage device, an image area storage device, a data writing device, and an image output state monitoring device. The image area separation device separates input image data into image data and image area separation data. The compression device compresses the image data. The data writing device writes the image area separation data to the image area storage device, secures an initial compressed image storage region in the image storage device, and sequentially stores the compressed image data in the initial compressed image storage region. The image output state monitoring device monitors a compressed image data amount, and causes the data writing device to secure an additional storage region in the image storage device when the compressed image data amount has reached or exceeded a data amount storable in the initial compressed image storage region.

13 Claims, 6 Drawing Sheets

IMAGE PROCESSING APPARATUS, IMAGE PROCESSING METHOD, AND STORAGE MEDIUM STORING COMPUTER PROGRAM FOR IMAGE AREA SEPARATION PROCESSING

CROSS-REFERENCE TO RELATED APPLICATIONS

The present patent application claims priority pursuant to 35 U.S.C. §119 from Japanese Patent Application No. 2007-284040, filed on Oct. 31, 2007 in the Japan Patent Office, the entire contents of which are hereby incorporated herein by reference.

BACKGROUND

1. Field

The present invention relates to an image processing apparatus, method, and storage medium storing a computer program that causes the image processing apparatus to execute the image processing method, and more specifically, to an image processing apparatus, such as a scanner, a facsimile machine, a computer, a digital camera, and a video player, which compresses and stores input image data in a memory to reuse the image data, an image processing method performed by the image processing apparatus, and a computer-readable storage medium storing a computer program that causes the image processing apparatus to execute the image processing method.

2. Description of the Background

In an image processing apparatus such as a copier, a printer, a facsimile machine, a multifunctional device capable of performing several of the foregoing functions, or the like, in order to make clear an edge portion of a text or line drawing in an original document (hereinafter simply "document"), and to smooth the shading gradation of a halftone dot image in a photo image or the like, image area separation processing (also referred to as image characteristic detection processing) is performed on input image data including image area separation data that indicates whether the image data of the document forms a binary image portion, such as a text or line drawing (a text area), or a halftone dot image (a photograph area).

As a result, the input image data is separated into the image data and the image area separation data representing the result of the image area separation processing. On the basis of the image area separation data, characteristic correction or conversion processing, such as MTF (Modulation Transfer Function) correction (i.e., spatial filtering processing) and scanner gamma conversion, is performed on the image data in accordance with the result of the image area separation processing. The image area separation data is configured as single-bit or few-bit data. Image area determination may also include a determination of whether the image data forms a portion on an edge or a portion in a text or line width, whether the image data is chromatic or achromatic, and so forth.

Further, when a conventional image processing apparatus having an image memory produces a plurality of copies, the apparatus stores in the image memory the image data read from the document, and reads the stored image data to print out the plurality of copies. Accordingly, the number of document scanning operations for scanning the same document through a scanner unit can be reduced to one. In storing the image data in the image memory, the image data is compressed and then stored in the image memory to reduce the required memory size. In this case, if the data compression ratio is simply increased in one-way compression of the image data, any difference from the original image data is generated in the image data decompressed from the one-way compressed data, resulting in a reduction in the reliability and the fidelity of reproduction of the image data. To perform high-quality image processing, therefore, when storing the image data in the image memory, the image data prior to one-way compression is subjected to image area separation processing and then is compressed and stored in the image memory. Further, image area separation data is stored in an image area memory. When the compressed image data is read from the image memory and decompressed, the image area separation data is read from the image area memory as well. Then, on the basis of the image area separation data, characteristic correction or conversion such as MTF correction and scanner gamma conversion is performed on the decompressed image data.

According to a conventional technique, when storing the image data of the document in the image memory, image area separation processing is performed on the image data prior to compression using an image processing semiconductor integrated circuit such as an ASIC (Application Specific Integrated Circuit). The image area separation data representing the result of image area separation processing is stored in the image area memory.

Further, the image data and the image area separation data are divided into blocks both in main and sub-scanning directions in pixel matrices each including a plurality of pixels. The respective blocks of image data are compressed into fixed-length codes. Then, the compressed image data and the image area separation data are stored in a memory. Thereafter, when the compressed image data read from the memory is decompressed, the image data is converted into color component data having image expression characteristics in accordance with the content of the image area separation data read from the memory.

According to the conventional technique described above, image area separation processing is performed on the image data prior to compression to generate the image area separation data. The image area separation data and the image data are divided into blocks in predetermined pixel matrices, and the image data is compressed and stored in the memory block by block. Consequently, the actual amount of compressed image data code is unknown, preventing memory from being dynamically secured according to the amount of compressed image data code and the data size of the image area separation data during the transfer of the image data. As a result, a memory capacity having extra space needs to be prepared in advance to store the respective blocks of the compressed image data. Therefore, the conventional technique is open to improvement in the use efficiency of the memory.

In view of the above-described situation, the present disclosure provides an image processing apparatus and method capable of performing image processing with an excellent image quality by storing compressed image data and image area separation data in a memory while improving the use efficiency of the memory, and a storage medium storing a computer program that causes the image processing apparatus to execute the image processing method.

SUMMARY

At least one of illustrative embodiments of the present invention provides an image processing apparatus and method capable of performing image processing with excellent image quality by storing compressed image data and image area separation data in a memory while improving the use efficiency of the memory, and a storage medium storing a computer program that causes the image processing apparatus to execute the image processing method.

In one illustrative embodiment of the present invention, an image processing apparatus includes an image area separation device, a compression device, an image storage device, an image area storage device, a data writing device, and an image output state monitoring device. The image area separation device separates input image data into image data and image area separation data. The compression device compresses the image data in accordance with a given compression method. The image storage device stores the compressed image data. The image area storage device stores the image area separation data. The data writing device writes the image area separation data to the image area storage device, secures an initial compressed image storage region of a predetermined data size in the image storage device, and sequentially stores the compressed image data in the initial compressed image storage region. The image output state monitoring device monitors a compressed image data amount, and causes the data writing device to secure an additional storage region in the image storage device upon determination that the compressed image data amount has reached or exceeded a data amount storable in the initial compressed image storage region.

In another illustrative embodiment of the present invention, an image processing method includes separating input image data into image data and image area separation data, compressing the image data in accordance with a given compression method, storing the image area separation data in an image area storage device, securing an initial compressed image storage region of a predetermined data size in an image storage device, sequentially storing the compressed image data in the initial compressed image storage region, monitoring a compressed image data amount, and securing an additional storage region in the image storage device upon determination that the compressed image data amount has reached or exceeded a data amount storable in the initial compressed image storage region.

In still another illustrative embodiment of the present invention, a computer-readable storage medium storing program codes that cause a computer to execute a method of processing an image, the method includes separating input image data into image data and image area separation data, compressing the image data in accordance with a compression method, storing the image area separation data in an image area storage device, securing an initial compressed image storage region of a predetermined data size in an image storage device, sequentially storing the compressed image data in the initial compressed image storage region, monitoring a data amount of the compressed image data, and securing an additional storage region in the image storage device upon determination that the compressed image data amount has reached or exceeded a data amount storable in the initial compressed image storage region.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein.

Figure 1:
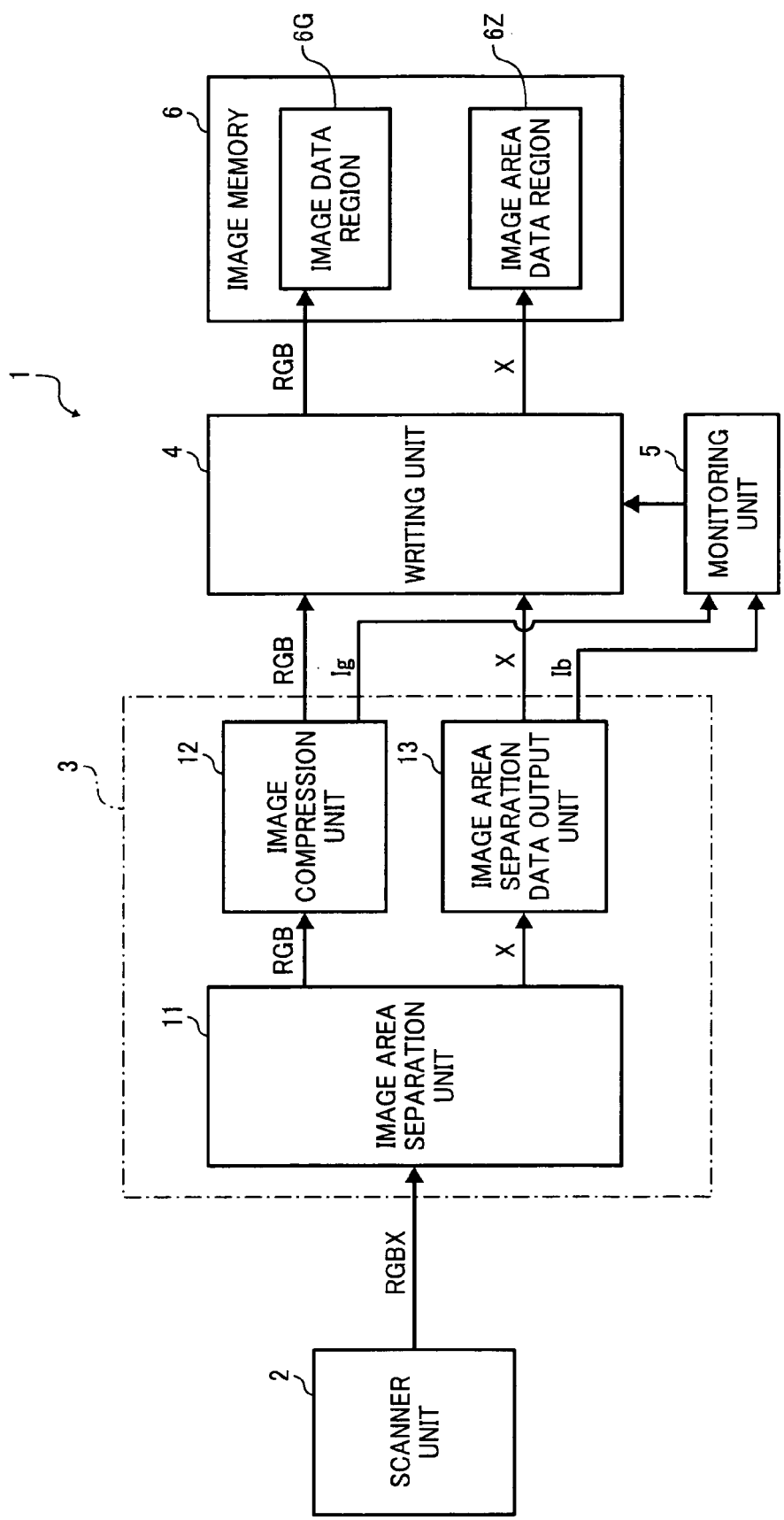
FIG. 1 is a block configuration diagram illustrating relevant parts of a digital copier illustrated as an image processing apparatus according to an illustrative embodiment of the present invention.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, wherein like reference numerals designate identical or corresponding parts throughout the several views, particularly to FIGS. 1 to 5B, an illustrative embodiment of the present invention will be described.

FIGS. 1 to 5B are diagrams illustrating an image processing apparatus, an image processing method, an image processing program, and a storage medium according to an illustrative embodiment of the present invention. FIG. 1 is a block configuration diagram of relevant parts of a digital copier 1 to which the image processing apparatus, the image processing method, and the image processing program, and the storage medium according to an illustrative embodiment of the present invention are applied.

In FIG. 1, the digital copier 1 includes a scanner unit 2, an ASIC (Application Specific Integrated Circuit) 3, a writing unit 4 serving as a data writing device, a monitoring unit 5 serving as an image output state monitoring device, an image memory 6, and so forth. The ASIC 3 includes an image area separation unit 11, an image compression unit 12, and an image area separation data output unit 13, and functions as an image processing device. The image memory 6 includes an image data region 6G serving as an image storage device and an image area data region 6Z serving as an image area storage device. The digital copier 1 further includes a printer unit for forming a color image on the basis of image data subjected to image processing by the ASIC 3, an operation display unit for providing instruction on the operation of the digital copier 1 and displaying a variety of information notified by the digital copier 1 to an operator thereof, and a controller for controlling the overall operation of the digital copier 1, for example.

The scanner unit 2 applies scanning light emitted from a light source to a document, and condenses the light reflected by the document to a light receiving element such as a CCD (Charge Coupled Device) via mirrors and lenses to photoelectrically convert the condensed light through the light receiving element. Thus, the scanner unit 2 scans the document both in the main and sub-scanning directions and reads a color image of the document. The scanner unit 2 digitally converts a color image signal, and outputs to the ASIC 3 a digital image signal (i.e., image data) RGBX, which includes image area separation data X representing image area separation information.

In such operations as the production of a plurality of copies, to appropriately and efficiently use the image data while efficiently using the image memory 6, the digital copier 1 performs image area separation processing on the input image data RGBX read by the scanner unit 2. The digital copier 1 compresses and stores the separated image data RGB in the image data region 6G of the image memory 6, and stores the image area separation data X in the image area data region 6Z of the image memory 6.

As the printer unit, for example, a printer is used which outputs a color image on a recording sheet serving as a recording medium according to an electrophotographic method on the basis of the image data ultimately converted into YMCK (i.e., yellow, magenta, cyan, and black). The conversion data is obtained by performing the image processing on coded data, i.e., the compressed image data RGB stored in the image data region 6G of the image memory 6, with the use of the image area separation data X stored in the image area data region 6Z. If a printer according to the electrophotographic method is employed as the printer unit, the printer unit includes, for example, photoconductors, an optical writing unit, a development unit, a charging unit, a cleaning unit, and so forth. In accordance with the color image data and a control signal, the printer unit activates the optical writing unit for the respective colors to form electrostatic latent images on the photoconductors, and causes the development unit to supply toner onto the photoconductors to form toner images. As an engine is activated, the recording sheet is fed from a sheet feeding unit and conveyed to a space between the photoconductors and a transfer unit, and the toner images formed on the photoconductors are transferred onto the recording sheet. Further, the recording sheet transferred with the toner images is conveyed to a fixing unit, and the fixing unit fixes the toner images on the recording sheet by heat and pressure, thereby forming an image on the sheet.

Further, the digital copier 1 reads and loads, in a memory or the like, an image processing program according to an illustrative embodiment of the present invention for performing image storage processing accompanying memory region control processing (hereinafter "the memory region control and image storage processing," respectively). The image processing program is recorded on a recording medium such as a CD (Compact Disc), a CD-RW (Compact Disc Rewritable), a DVD (Digital Video Disc), and a flexible disc. Then, a CPU (Central Processing Unit) executes the image processing program. With the above configuration, the digital copier 1 is configured as an image processing apparatus that performs, as the image processing method, the memory region control and image storage processing described later.

Upon setting of a division unit (hereinafter referred to as a "band unit" when needed) of the input image data RGBX in the ASIC 3 by the scanner unit 2 through the operation of a DIP (dual in-line package) switch (i.e., a division unit setting device), for example, the digital copier 1 sets the information of the division unit in the ASIC 3, the writing unit 4, and the monitoring unit 5. The digital copier 1 performs the following image processing in the division units. For example, if the image data RGB is formed by 4,961 lines of 32-bit RGB pixels with 7,016 pixels included in each of the lines extending in the main scanning direction, the digital copier 1 performs the image processing in the division units each including 512 lines, for example. That is, if each of the division units includes 512 lines, the division number for dividing one page is ten, as derived from an equation $4,961/512=9.689\ldots$. Thus, the digital copier 1 divides the image data RGB into ten division units, each forming one band, and performs the image processing on a band-by-band basis.

Upon setting of the above-described division unit, the writing unit 4 secures, in the image data region 6G of the image memory 6, an initial image data region (an initial compressed image storage region), which is a memory region having a memory capacity corresponding to the product of an expected divided code amount and the division number (the band number). Herein, the expected divided code amount is a code amount obtained by the compression of the division unit of the image data RGB performed by the image compression unit 12 with an expected compression ratio (i.e., the compression ratio expected to be used in the compression of the image data RGB by the image compression unit 12) Further, the division number is a number obtained by dividing the input, image data RGBX by the division unit. Upon receipt of an instruction for memory addition from the monitoring unit 5, the writing unit 4 secures in the image memory 6 an additional memory region corresponding to the bands specified by the instruction for memory addition. Further, on the basis of the division number and the data amount of the division unit of the image area separation data X, the writing unit 4 secures in the image memory 6 the image area data region 6Z having a memory capacity for storing the division unit of the image area separation data X multiplied by the band number, i.e., one page of the image area separation data X.

The image area separation unit 11 performs the image area separation processing on the digital input image data RGBX input from the scanner unit 2. The image area separation unit 11 outputs the separated image area separation data X to the image area separation data output unit 13, and outputs the separated image data RGB to the image compression unit 12. The image area separation processing is processing of separating the image data RGB from the image area separation data X, which indicates whether a processing target portion of the input image data RGBX input from the scanner unit 2 forms a binary image such as a text and a line drawing (i.e., a text area) or a halftone dot image (i.e., a photograph area). The image area separation data X may be configured as two-bit data, for example, and may include the information of whether the processing target portion is on an edge portion or in a text or line width and the information of whether the processing target portion is chromatic or achromatic as well as the information of whether the processing target portion of the image data RGB forms the text area or the photograph area.

After decoding the compressed image data RGB stored in the image data region 6G of the image memory 6 with reference to the image area separation data X, the digital copier 1 performs post-processing, e.g., correction or conversion processing such as MTF (Modulation Transfer Function) correction (i.e., spatial filtering processing) and scanner gamma conversion in a post-processing unit. On the basis of the image data RGB subjected to the above processing, the digital copier 1 forms an image in the printer unit.

The image area separation data output unit 13 divides the image area separation data X input from the image area separation unit 11 by using the above-described division unit (e.g., 512 lines in the above example) of the input image data RGBX as one band. The image area separation data output unit 13 outputs the divided image area separation data X to the writing unit 4, and outputs to the monitoring unit 5 an image area interrupt signal Ib notifying of the output of the band unit of the image area separation data X. The function of outputting the image area interrupt signal Ib notifying of the output of the band unit of the image area separation data X is provided as a basic function incorporated in the ASIC 3.

The image compression unit 12 compresses (i.e., encodes) the image data RGB, which is input from the image area separation unit 11, in the division units with a predetermined compression ratio in accordance with a predetermined compression method such as JPEG (Joint Picture Engineering Group), for example. The image compression unit 12 outputs the compressed image data RGB (hereinafter referred to as "encoded data" when needed) to the writing unit 4. After compressing the division unit of the image data RGB and outputting the division unit (i.e., the band unit) of the encoded data to the writing unit 4, the image compression unit 12 outputs to the monitoring unit 5 an image interrupt signal Ig notifying of the output of the band unit of the encoded data. The function of outputting the image interrupt signal Ig notifying of the output of the band unit of the encoded data is provided as a basic function incorporated in the ASIC 3. As described above, if the image data RGB is formed by 4,961 lines of 32-bit RGB pixels with 7,016 pixels included in each of the lines extending in the main scanning direction, for example, the image compression unit 12 divides the image data RGB by using the division unit including the 512 lines, for example, and compresses the image data RGB in the division units. That is, when 512 lines form the division unit, the image compression unit 12 divides the image data RGB into ten division units on the basis of the equation $4,961/512=9.689\ldots$. Using each of the division units as one band, the image compression unit 12 compresses the image data RGB in the bands. The image compression unit 12 outputs the band unit of the compressed image data RGB (i.e., the encoded data) to the writing unit 4, and outputs the image interrupt signal Ig to the monitoring unit 5.

Upon setting of the division unit, the monitoring unit 5 calculates the division number for dividing one page of the image data RGB. Every time the image area interrupt signal Ib is input from the image area separation data output unit 13 of the ASIC 3, the monitoring unit 5 counts, during the input interval of the image area interrupt signal Ib, the number of the image interrupt signals Ig input from the image compression unit 12 of the ASIC 3. Thus, the monitoring unit 5 monitors whether or not the actual compression ratio of the division unit of the image data RGB compressed by the image compression unit 12 is higher than an expected compression ratio, i.e., whether or not the image data RGB has been compressed into encoded data having a smaller data amount than an expected divided code amount (i.e., an expected divided image data amount), which is the code amount obtained by the compression of the image data RGB with the expected compression ratio. If the image interrupt signal Ig is input during the input interval of the image area interrupt signal Ib, the ratio of compression by the image compression unit 12 becomes lower than the expected compression ratio. Thus, the monitoring unit 5 determines that the initial image data region secured in the image data region 6G cannot store all of the encoded data actually compressed by the image compression unit 12. The monitoring unit 5 sends the writing unit 4 an instruction for memory addition to instruct the writing unit 4 to secure an additional memory region having a data size corresponding to the number of the image interrupt signals Ig. Upon receipt of the instruction for memory addition from the monitoring unit 5, the writing unit 4 secures, in the image data region 6G of the image memory 6, the additional memory region having the data size specified by the instruction for memory addition.

Next, operations of the present illustrative embodiment are described.

In such operations as the production of a plurality of copies, in order to appropriately and efficiently use the image data RGB while efficiently using the image memory 6, the digital copier 1 of the present illustrative embodiment performs the image area separation processing on the input image data RGBX after the writing unit 4 secures the initial image data region of a predetermined data size in the image data region 6G of the image memory 6. The image compression unit 12 compresses the separated image data RGB, and the writing unit 4 stores the compressed image data RGB in the image data region 6G of the image memory 6. The writing unit 4 also stores the image area separation data X in the image area data region 6Z of the image memory 6. Meanwhile, the monitoring unit 5 monitors the output state of the compressed image data RGB to dynamically manage the memory region in the image data region 6G of the image memory 6.

Thus, according to the digital copier 1, upon setting of the division unit, the CPU sets the division unit in the image compression unit 12 and the image area separation data output unit 13 of the ASIC 3, the writing unit 4, and the monitoring unit 5. The writing unit 4 secures the initial image data region in the image data region 6G of the image memory 6. The initial image data region is a memory region having a memory capacity corresponding to the product of the expected divided code amount and the division number (i.e., the band number) where the expected divided code amount is the code amount expected to be obtained by the compression of the division unit of the image data RGB, and the division number is the number obtained by the division of the input image data RGB by the division unit. Further, the writing unit 4 secures, as the image area data region 6Z of the image memory 6, a memory capacity to store the image area separation data X included in one page of the input image data RGBX.

For example, as described above, it is assumed here that the scanner unit 2 scans the image data RGBX, which includes 4,961 lines of 32-bit RGB pixels in each page and 7,016 pixels in each of the lines extending in the main scanning direction. In this case, if 512 lines are set as the division-unit, the division number for one page is ten, as derived from the equation $4,961/512=9.689\ldots$.

Assuming that the expected compression ratio expected to be used by the image compression unit 12 is eight, the expected divided code amount of one band corresponding to the division unit is calculated as the product of the image data amount of the division unit and the expected compression ratio. Thus, the expected divided code amount of one band is 1,347,072 bytes, as derived from an equation $7,016*3*512*1/8=1,347,072$. Further, the expected code amount of one page of the image data RGB (i.e., the per-page expected code amount) equals the expected divided code amount multiplied by ten bands, i.e., 13,470,720 bytes, as derived from an equation $1,347,072*10$ (i.e., the division number)$=13,470,720$.

Therefore, upon setting of 512 lines as the division unit, the digital copier 1 secures, in the image data region 6G of the image memory 6, the initial image data region, which is a memory region having a data size corresponding to the per-band expected divided code amount of 1,347,072 bytes multiplied by ten bands (i.e., 13,470,720 bytes).

Meanwhile, the data amount of the division unit of the image area separation data X is 898,048 bytes, as derived from an equation 7,016*2/8*512=898,048. Thus, the data amount of the image area separation data X in one page of the input image data RGBX is 8,980,480 bytes, as derived from an equation of 898,048*10 (i.e., the division number)=8,980,480.

Therefore, upon setting of 512 lines as the division unit, the digital copier 1 secures, as the image area data region 6Z of the image memory 6, a memory region having a data size corresponding to the per-band image area separation data amount of 898,048 bytes multiplied by ten bands (i.e., 8,980,480 bytes).

Then, upon setting of the division unit, the monitoring unit 5 calculates the division number for dividing one page of the image data RGB. Further, every time the image area interrupt signal Ib is input from the image area separation data output unit 13 of the ASIC 3, the monitoring unit 5 counts, during the input interval of the image area interrupt signal Ib, the number of the image interrupt signals Ig input from the image compression unit 12 of the ASIC 3. Thus, the monitoring unit 5 monitors, in the division units, whether or not the actual compression ratio of the image data RGB compressed by the image compression unit 12 is higher than the expected compression ratio. On the basis of the result of the monitoring, the memory region is appropriately secured in the image data region 6G.

That is, in the state in which the division unit is set in the respective units and the required initial image data region is secured in the image data region 6G as described above, when the document is set on the scanner unit 2 and the start of the scanning operation is instructed, the digital copier 1 performs the operation of scanning the document through the scanner unit 2, and inputs the digital input image data RGBX to the ASIC 3.

In the ASIC 3, the image area separation unit 11 performs the image area-separation processing on the input image data RGBX input from the scanner unit 2. The image area separation unit 11 outputs the image data RGB to the image compression unit 12 and the image area separation data X to the image area separation data output unit 13.

The image compression unit 12 compresses, in the band units, the image data RGB input from the image area separation unit 11, and outputs to the writing unit 4 the encoded data, which is the compressed image data RGB. At every output of the encoded data of one band (i.e., the divided encoded data) to the writing unit 4, the image compression unit 12 outputs the image interrupt signal Ig to the monitoring unit 5.

Meanwhile, the image area separation data output unit 13 divides the image area separation data X input from the image area separation unit 11 into the per-band image area separation data amounts set as described above, and outputs to the writing unit 4 the image area separation data X in the bands. At every output of one band of the image area separation data X to the writing unit 4, the image area separation data output unit 13 outputs the image area interrupt signal Ib to the monitoring unit 5.

The writing unit 4 sequentially stores, in the initial image data region secured in the image data region 6G of the image memory 6, the RGB encoded data in the bands input from the image compression unit 12 of the ASIC 3, starting from the initial address of the initial image data region. Further, the writing unit 4 sequentially stores, in the image area data region 6Z of the image memory 6, the image area separation data X in the bands input from the image area separation data output unit 13 of the ASIC 3, starting from the initial address of the image area data region 6Z.

Figure 2:
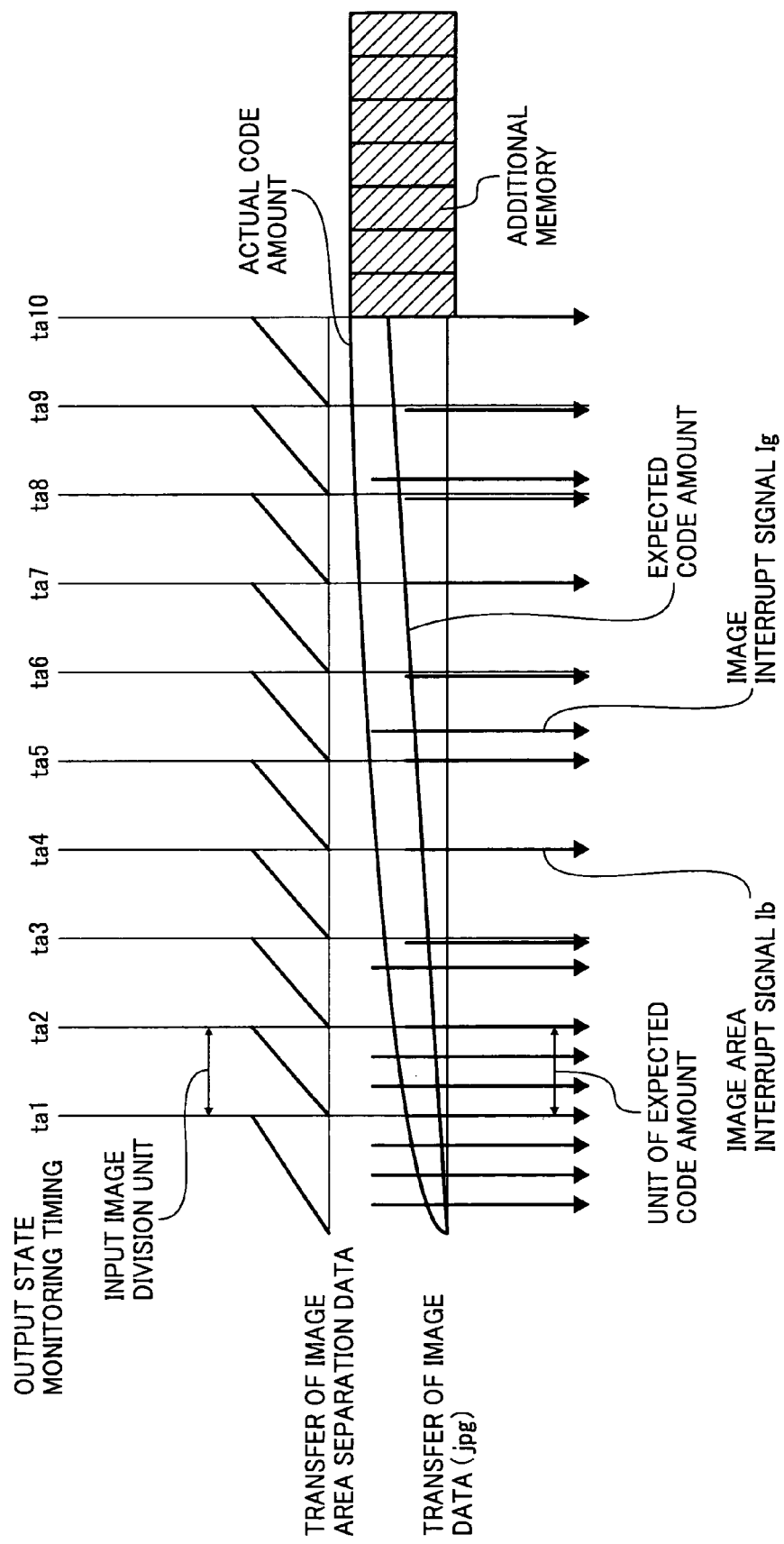
FIG. 2 is a schematic diagram illustrating transfer of image data bands and securing of a memory performed for the respective image area separation data bands by the digital copier of FIG. 1.

As illustrated in FIG. 2, it is assumed here that each of output state monitoring timings ta1 to ta10 represents a timing at which one band of the image area separation data X is transferred from the image area separation data output unit 13 to the writing unit 4 and the image area interrupt signal Ib is input to the monitoring unit 5 from the image area separation data output unit 13. At each of the output state monitoring timings ta1 to ta10, the monitoring unit 5 monitors the number of the image interrupt signals Ig representing the code amount of the encoded data, which is the image data RGB compressed by the image compression unit 12, to monitor how many bands of the encoded data have been output to the writing unit 4 and stored in the image data region 6G. Then, if the image interrupt signal Ig is input to the monitoring unit 5 from the image compression unit 12 during the time period between an adjacent pair of the output state monitoring timings ta1 to ta10, i.e., during the time period from the input of an image area interrupt signal Ib to the input of the subsequent image area interrupt signal Ib, the monitoring unit 5 outputs the instruction for memory addition to the writing unit 4 to instruct the writing unit 4 to secure the additional memory region having a data size of the bands corresponding to the number of the input image interrupt signals Ig. Meanwhile, if the image interrupt signal Ig is not input to the monitoring unit 5 during the time period between an adjacent pair of the output state monitoring timings ta1 to ta10, i.e., if the amount of the image data RGB compressed by the image compression unit 12 falls short of one band, the monitoring unit 5 does not output the instruction for memory addition to the writing unit 4.

That is, as illustrated in FIG. 2, at each of the output state monitoring timings ta1 to ta10 indicated by an arrow to represent the image area interrupt signal Ib, the monitoring unit 5 outputs to the writing unit 4 the instruction for memory addition to add a memory region having a data size corresponding to the bands of the expected code amount according to the number of times in which the code amount indicated by an arrow to represent the image interrupt signal Ig has reached one band.

Upon receipt of and in accordance with the instruction for memory addition from the monitoring unit 5, the writing unit 4 secures, in the image data region 6G of the image memory 6, the additional memory region having the data size corresponding to the bands specified by the instruction for memory addition. Meanwhile, in the absence of the instruction for memory addition, the writing unit 4 does not secure the additional memory region.

Figure 3:
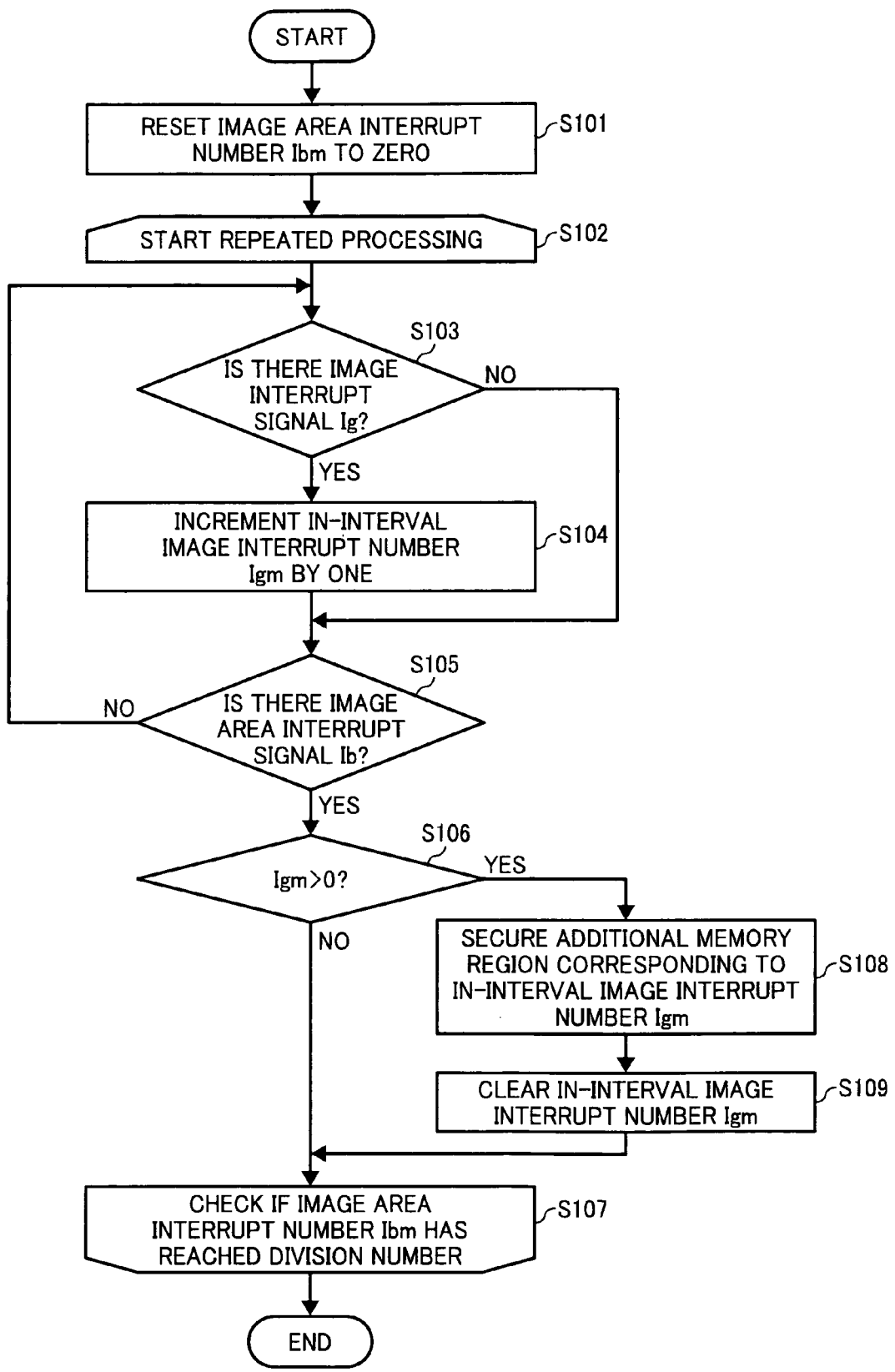
FIG. 3 is a flowchart illustrating memory region control and image storage processing performed by the digital copier of FIG. 1.

Then, upon setting of the document on the scanner unit 2 and operation of a start key in a mode for storing the image data RGB in the image data region 6G of the image memory 6, the digital copier 1 starts the operation of scanning the document through the scanner unit 2, and performs the memory region control and image storage processing illustrated in FIG. 3 on the image data RGB scanned by the scanner unit 2.

That is, upon setting of the document on the scanner unit 2 and operation of the start key, at S101 the digital copier 1 resets to zero an image area interrupt number Ibm, which is the number of counts by a counter that counts the number of the image area interrupt signals Ib input to the monitoring unit 5. At S102, the digital copier 1 starts repeated memory management processing, which is the management by the monitoring unit 5 of the image data region 6G of the image memory 6 on the basis of the number of the image interrupt signals Ig input during the input interval of the image area interrupt signal Ib in one page of the input image data RGBX.

Upon start of the repeated memory management processing, at S103 the monitoring unit 5 checks whether or not there is the image interrupt signal Ig. If there is the image interrupt signal Ig, at S104 the monitoring unit 5 adds one to an in-interval image interrupt number Igm, which is the number of counts by a counter that counts the number of the image interrupt signals Ig input during the input interval of the image area interrupt signal Ib. That is, the monitoring unit 5 increments the in-interval image interrupt number Igm by one, i.e., Igm+1. At S105, the monitoring unit 5 checks whether or not there is the image area interrupt signal Ib, which indicates the output timing of one band of the image area separation data X.

If there is not the image area interrupt signal Ib at S105, the monitoring unit 5 returns to S103 to check whether or not there is the image interrupt signal Ig. If there is not the image interrupt signal Ig, at S105 the monitoring unit 5 checks whether or not there is the image area interrupt signal Ib, without incrementing the in-interval image interrupt number Igm. If there is not the image area interrupt signal Ib at S105, the monitoring unit 5 returns to S103 to repeat the above-described processes.

If there is the image area interrupt signal Ib at S105, at S106 the monitoring unit 5 checks whether or not the in-interval image interrupt number Igm is positive, i.e., Igm>0. Then, if the in-interval image interrupt number Igm is zero, the monitoring unit 5 determines that the actual data amount of the compressed image data RGB (i.e., the code amount) is smaller than the expected code amount. In this case, the monitoring unit 5 does not send the writing unit 4 the instruction for memory addition for instructing to secure the additional memory region. At S107, the monitoring unit 5 checks whether or not the image area interrupt number Ibm has reached the division number, i.e., whether or not one page of the image data RGB has been stored in the image data region 6G of the image memory 6. If the process of storing one page of the image data RGB has not been completed, the monitoring unit 5 returns to S102 to perform the above-described processes in a manner as described above, starting with the process of checking the presence or absence of the image interrupt signal Ig (from S102 to S107).

If the in-interval image interrupt number Igm is positive, i.e., Igm>0 at S106, the monitoring unit 5 outputs to the writing unit 4 the instruction for memory addition for instructing to secure the additional memory region having a data size corresponding to the expected divided code amount multiplied by the in-interval image interrupt number Igm (i.e., the band number). At S108, the writing unit 4 secures, in the image data region 6G of the image memory 6, the additional memory region having a memory size according to the instruction for securing the additional memory region.

Having output to the writing unit 4 the instruction for memory addition and having caused the writing unit 4 to secure the additional memory region, at S109 the monitoring unit 5 clears the in-interval image interrupt number Igm. At S107, the monitoring unit 5 checks whether or not the image area interrupt number Ibm has reached the division number. If the image area interrupt number Ibm has not reached the division number, and if the process of storing one page of the image data RGB has not been completed, the monitoring unit 5 returns to S102 to perform the above-described processes in a manner as described above, starting with the process of checking the presence or absence of the image interrupt signal Ig (from S102 to S109).

At S107, if one page of the image data RGB has been stored in the image data region 6G of the image memory 6, and if the image area interrupt number Ibm has reached the division number, the monitoring unit 5 completes the repeated memory management processing. Upon completion of the above-described memory region control and image storage processing on all documents set on the scanner unit 2, the processing is completed.

Figure 4A:
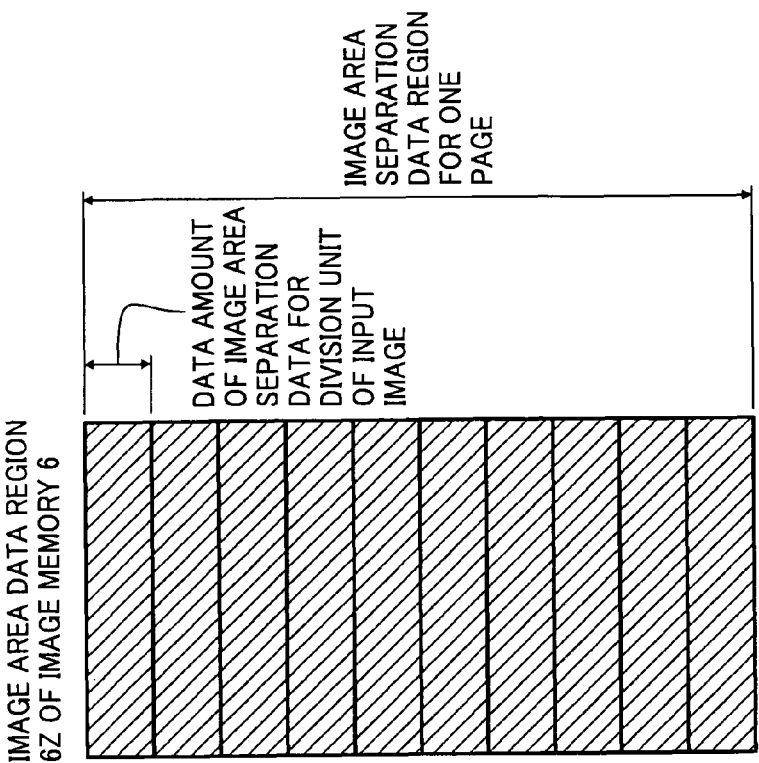
FIGS. 4A and 4B are diagrams for explaining an image data region and an image area data region in a state in which an additional memory region does not need to be secured in the memory region control and image storage processing of FIG. 3.
Figure 4B:
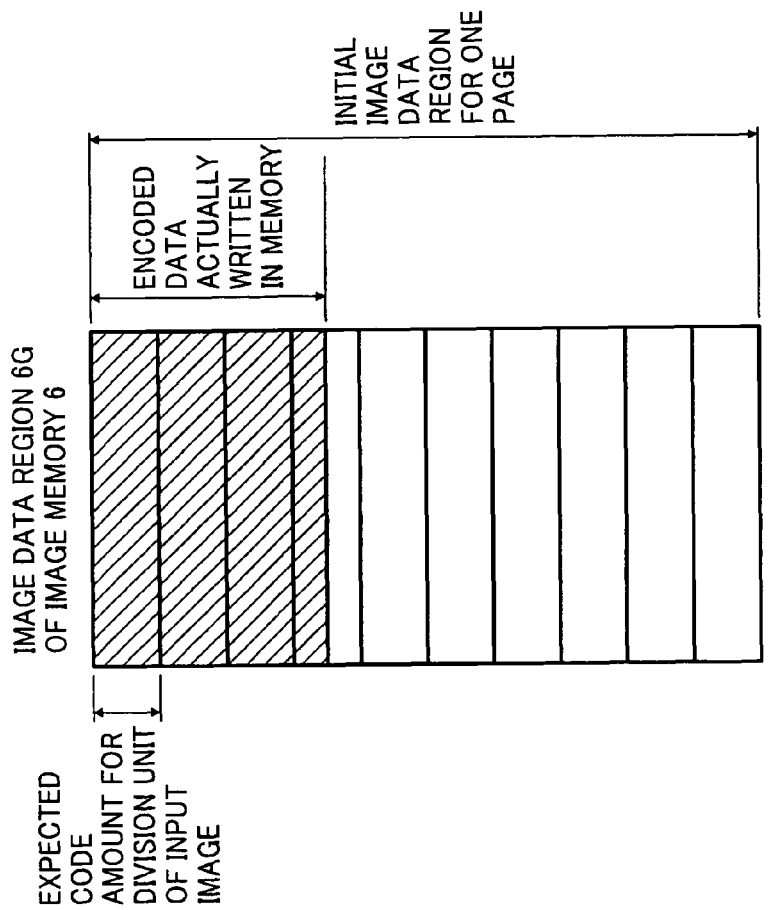
Figure 5B:
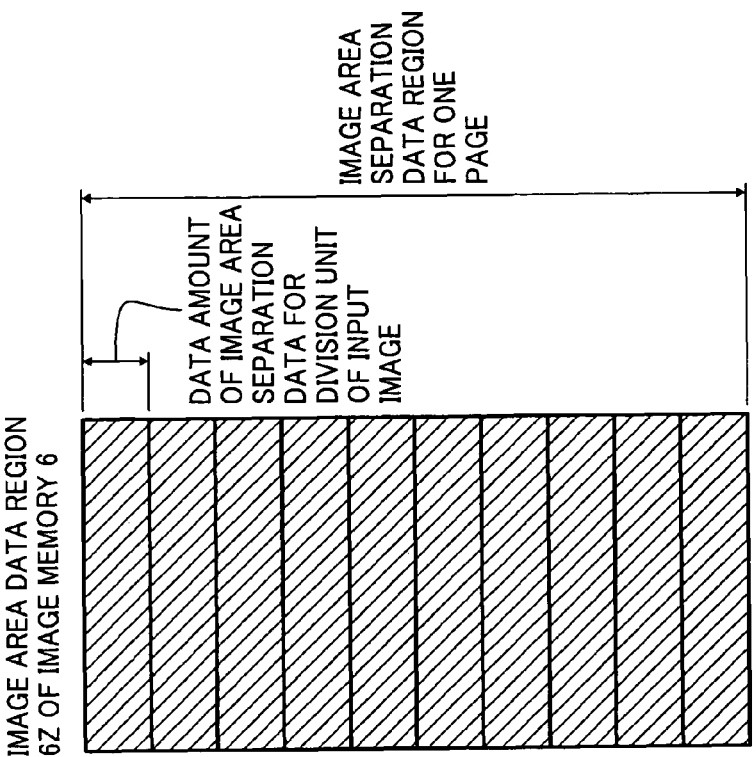
FIGS. 5A and 5B are diagrams illustrating an image data region and an image area data region in a state in which an additional memory region needs to be secured in the memory region control and image storage processing of FIG. 3.
Figure 5A:
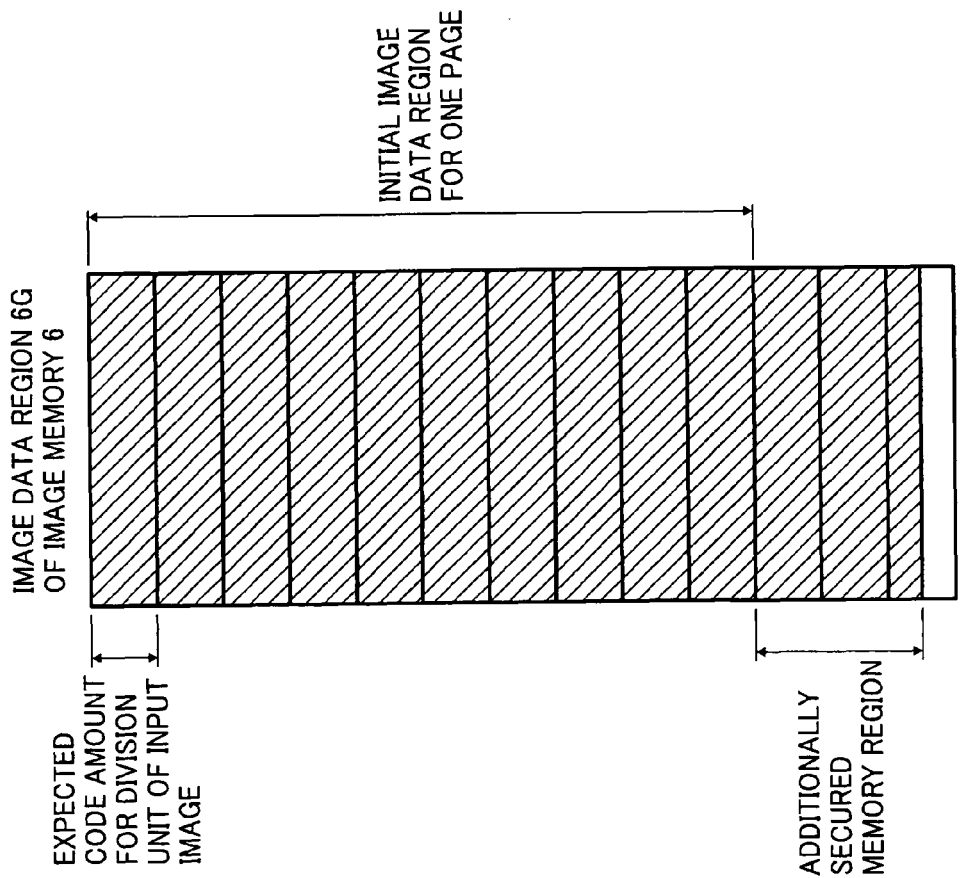

That is, upon setting of the division unit, the digital copier 1 secures, in the image data region 6G of the image memory 6, the initial image data region, i.e., the memory region to store the expected code amount of the encoded data, which is the image data RGB compressed with the expected compression ratio, on the basis of the division unit and the per-page image data amount of the image data RGB, as illustrated in FIGS. 4A and 5A. Further, the digital copier 1 secures, in the image area data region 6Z of the image memory 6, the image area separation data region which is the memory region to store one page of the image area separation data X (i.e., the division unit of the image area separation data X multiplied by the division number), as illustrated in FIGS. 4B and 5B. In FIGS. 4A and 5A, the digital copier 1 initially secures, in the image data region 6G of the image memory 6, the initial image data region for storing ten bands, where a memory region for storing one band has a data size corresponding to the encoded data obtained by the compression of the division unit of the image data RGB with the expected compression ratio (i.e., the expected divided code amount of the encoded data). Further, in FIGS. 4B and 5B, the digital copier 1 secures, in the image memory 6, the image area data region 6Z for storing one page of the image area separation data X, i.e., ten bands of the division unit of the image area separation data X obtained by the division of the image area separation data X into the bands.

As described above, in every transfer of one band of the image area separation data X, the digital copier 1 monitors through the monitoring unit 5 whether or not the expected divided code amount has been exceeded by the code amount of the divided encoded data (i.e., the divided code amount) obtained by the actual compression (i.e., encoding) of one band of the image data RGB. If the expected divided code amount has not been exceeded by the actual divided code amount of the divided encoded data, the digital copier 1 does not secure the additional memory region in the image data region 6G of the image memory 6. The digital copier 1 sequentially stores the encoded data in the initial image data region in the image data region 6G of the image memory 6. If one page of the image data RGB has been coded and stored in the image data region 6G of the image memory 6 without excess over the expected divided code amount by the actual divided code amount of the divided encoded data in all bands, one page of the encoded data is all stored in the initial image data region having a data size of one page, which has initially been secured in the image data region 6G of the image memory 6. Further, the digital copier 1 monitors, on the band-by-band basis, whether or not the expected divided code amount has been exceeded by the actual divided code amount of the divided encoded data. If the expected divided code amount has been reached or exceeded by the actual divided code amount, the digital copier 1 dynamically secures the additional memory region in the image data region 6G of the image memory 6, and performs the processing of sequentially storing the encoded data from the initial image data region into the image data region 6G of the image memory 6. If one page of the image data RGB has been coded and stored in the image data region 6G of the image memory 6, one page of the encoded data is all stored in the initial image data region and the additionally secured additional memory region, as illustrated in FIG. 5A.

As described above, according to the digital copier 1 of the present illustrative embodiment, the writing unit 4 secures the initial image data region of a predetermined data size in the image data region 6G of the image memory 6. The image area separation unit 11 separates the input image data RGBX into the image data RGB and the image area separation data X, and the image compression unit 12 compresses the image data RGB. The writing unit 4 sequentially stores the encoded data, i.e., the compressed image data RGB in the initial image data region of the image data region 6G. The writing unit 4 further stores the image area separation data X in the image area data region 6Z of the image memory 6. Meanwhile, the monitoring unit 5 monitors the code amount of the encoded data stored in the image data region 6G. If the monitoring unit 5 determines that the code amount has reached or exceeded the data amount storable in the initial image data region, the monitoring unit 5 sends the writing unit 4 the instruction for memory addition. The writing unit 4 secures the additional memory region in the image data region 6G of the image memory 6.

Accordingly, it is possible to improve the image quality of the encoded data (i.e., the compressed image data RGB) stored in the image memory 6 and decompressed with the use of the image area separation data X. It is also possible to additionally secure the additional memory region in the image memory 6 only when the initial image data region cannot store all of the encoded data. Thus, a storage region having extra space does not need to be previously prepared in the image memory 6 as the initial image data region, thereby allowing the use efficiency of the image memory 6 to be increased.

Further, according to the digital copier 1 of the present illustrative embodiment, the image compression unit 12 compresses the image data RGB in the division units by using a predetermined block of the input image data RGBX as the division unit. The writing unit 4 secures, in the image data region 6G of the image memory 6, the initial image data region, which is the memory region having the memory capacity obtained by the multiplication of the expected divided code amount by the division number. The expected divided code amount is the code amount expected to be obtained by the compression of the division unit of the image data RGB. The division number is the number obtained by the division of the input image data RGBX by the division unit. Meanwhile, the monitoring unit 5 monitors, for the individual division unit of the image area separation data X, the divided code amount obtained by the actual compression of the division unit of the image data RGB. If the actual divided code amount has reached or exceeded the expected divided code amount, the monitoring unit 5 determines that the initial image data region cannot store all of the encoded data obtained by the compression of one page of the image data RGB. Thus, the monitoring unit 5 sends the writing unit 4 the instruction for memory addition to secure the additional memory region having the data size corresponding to the code amount by which the actual divided code amount has exceeded the expected divided code amount. The writing unit 4 secures, in the image data region 6G of the image memory 6, the additional memory region having the memory size specified by the instruction.

Accordingly, the code amount of the actually compressed image data RGB can be monitored in the division units, and the additional memory region of a required data size can be secured in the division units, thereby improving the processing efficiency. Further, the memory region of a more appropriate data size can be secured, thereby further improving the use efficiency of the image memory 6.

Further, according to the digital copier 1 of the present illustrative embodiment, the image area separation data X, which has been separated from the input image data RGBX by the image area separation unit 11, is output from the image area separation data output unit 13 to the writing unit 4 in the division units. At every output of the division unit of the image area separation data X, the image area separation data output unit 13 outputs the image area interrupt signal Ib to the monitoring unit 5. Every time the image compression unit 12 compresses the division unit of the image data RGB and outputs the compressed image data RGB to the writing unit 4, the image compression unit 12 outputs the image interrupt signal Ig to the monitoring unit 5. On the basis of the image interrupt signals Ig for the individual image area interrupt signal Ib, the monitoring unit 5 monitors the code amount of the division unit for the individual division unit of the image area separation data X.

Thus, the monitoring of the code amount can be efficiently and appropriately performed. Accordingly, it is possible to secure the memory region of a further appropriate data size in the image memory 6, thereby further improving the use efficiency of the image memory 6.

The digital copier 1 of the present illustrative embodiment is configured to be able to arbitrarily set the division unit for dividing the input image data RGBX through the operation of the DIP switch, for example.

Accordingly, it is possible to compress the image data RGB by appropriately determining the division unit of the image data RGB in accordance with the type of use of the image data RGB stored in the image memory 6, thereby improving the usability.

The digital copier 1 of the present illustrative embodiment includes the post-processing unit which uses at least the encoded data stored in the image memory 6, for example. The monitoring unit 5 may be configured to notify the post-processing unit of the start of the processing in which the image compression unit 12 compresses the image data RGB and the writing unit 4 stores the resultant encoded data in the image data region 6G of the image memory 6, on the basis of the result of the monitoring of the code amount of the thus processed encoded data.

With this configuration, the operation of the post-processing unit can be controlled in accordance with the storage state of the encoded data in the image data region 6G of the image memory 6. Accordingly, the post-processing can be appropriately performed on the encoded data, thereby further improving the use efficiency of the image memory 6.

Figure 6:
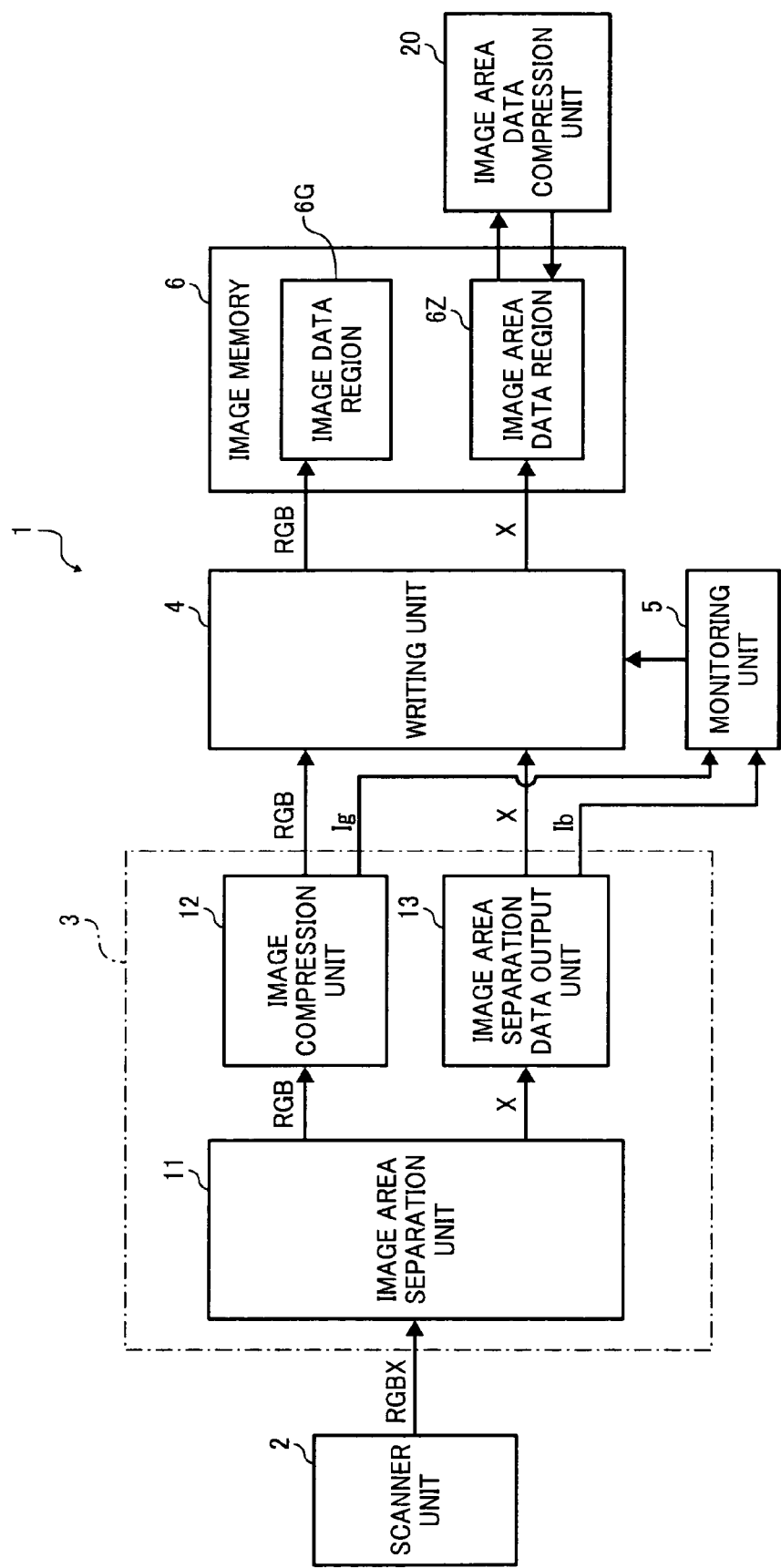
FIG. 6 is a block configuration diagram illustrating relevant parts of an example in which the digital copier of FIG. 1 is provided with an image area data compression unit.

Further, as illustrated in FIG. 6, the digital copier 1 may include an image area data compression unit (i.e., an image area separation data compression device) 20 for compressing the image area separation data X temporarily stored in the image area data region 6Z of the image memory 6.

The image area data compression unit 20 reads the image area separation data X stored in the image area data region 6Z of the image memory 6. The image area data compression unit 20 compresses the image area separation data X in accordance with a predetermined compression method, such as JPEG, for example, and stores the compressed image area separation data X again in the image area data region 6Z of the image memory 6.

With this configuration, the use efficiency of the image memory 6 for storing the image area separation data X can be further improved.

In the example described above, the single image memory 6 is divided into the image data region 6G for storing the encoded data and the image area data region 6Z for storing the image area separation data X such that the respective data regions store different data sets. Alternatively, a memory for storing the encoded data and a memory for storing the image area separation data X may be separately provided.

Although the above-described illustrative embodiments are applied to the digital copier 1, an image processing apparatus and a system employing the image processing apparatus according to the present invention are not limited to the digital copier 1 but may also include a scanner, a facsimile machine, a multifunctional machine, and so forth.

The above-described embodiments are illustrative and do not limit the present invention. Thus, numerous additional modifications and variations are possible in light of the above teachings. For example, elements at least one of features of different illustrative embodiments herein may be combined with each other at least one of substituted for each other within the scope of this disclosure and appended claims. Further, features of components of the illustrative embodiments, such as the number, the position, and the shape, are not limited to the illustrative embodiments and thus may be preferably set. It is therefore to be understood that within the scope of the appended claims, the disclosure of this patent specification may be practiced otherwise than as specifically described herein.

What is claimed is:

1. An image processing apparatus comprising: an image area separation device configured to separate input image data into image data and image area separation data;
   a compression device configured to compress the image data in accordance with a given compression method; an image storage device configured to store the compressed image data;
   an image area storage device configured to store the image area separation data;
   a data writing device configured to write the image area separation data to the image area storage device, secure an initial compressed image storage region of a predetermined data size in the image storage device, and sequentially store the compressed image data in the initial compressed image storage region; and
   an image output state monitoring device configured to monitor a compressed image data amount, and cause the data writing device to secure an additional storage region in the image storage device upon determination that the compressed image data amount has reached or exceeded a data amount storable in the initial compressed image storage region.

2. The image processing apparatus according to claim 1, wherein the compression device compresses the image data in a plurality of division units, each unit formed by a predetermined block of the input image data,
   wherein the data writing device secures, as the initial compressed image storage region in the image storage device, a storage region having a data size corresponding to the product of an expected divided image data amount multiplied by a division number, the expected divided image data amount being an expected data amount of the division unit of compressed image data and the division number being a number obtained by dividing the input image data by the division unit, and
   wherein the image output state monitoring device monitors, for the individual division unit of the image area separation data, the data amount of the division unit of the compressed image data, and
   wherein, upon determination that the data amount of the division unit of the compressed image data has reached or exceeded the expected divided image data amount, the image output state monitoring device causes the data writing device to secure, as the additional storage region in the image storage device, a storage region having a data size corresponding to a data amount by which the data amount of the division unit of the compressed image data exceeds the expected divided image data amount.

3. The image processing apparatus according to claim 2, further comprising:
   an image area separation data output device configured to receive the image area separation data from the image area separation device, output the image area separation data to the data writing device, and output an image area block output notification to the image output state monitoring device at every output of the division unit of the image area separation data to the data writing device,
   wherein the compression device outputs an image block output notification to the image output state monitoring device at every output of the division unit of the compressed image data to the data writing device, and
   wherein, based on the number of image block output notifications for the individual image area block output notification, the image output state monitoring device monitors, for the individual division unit of the image area separation data, the data amount of the division unit of the compressed image data.

4. The image processing apparatus according to claim 2, further comprising:
   a division unit setting device configured to arbitrarily set the division unit.

5. The image processing apparatus according to claim 1, further comprising:
   an image processing device configured to use at least the compressed image data stored in the image storage device,
   wherein the image output state monitoring device notifies the image processing device of the start of compression of the image data and storage of the compressed image data in the image storage device in accordance with monitoring results of the compressed image data amount obtained by the image output state monitoring device.

6. The image processing apparatus according to claim 1, further comprising:
   an image area separation data compression device configured to compress image area separation data temporarily stored in the image area storage device.

7. An image processing method comprising:
   a separation step of separating input image data into image data and image area separation data;
   an image data compression step of compressing the image data in accordance with a given compression method;
   a storage step of storing the image area separation data in an image area storage device;
   an initial storage region securing step of securing an initial compressed image storage region of a predetermined data size in an image storage device;
   a sequential storage step of sequentially storing the compressed image data in the initial compressed image storage region;
   a monitoring step of monitoring a compressed image data amount; and
   an additional storage region securing step of securing an additional storage region in the image storage device upon determination that the compressed image data amount has reached or exceeded a data amount storable in the initial compressed image storage region.

8. The image processing method according to claim 7,
wherein the image data compression step compresses the image data in a plurality of units, each unit formed by a predetermined block of the input image data,
wherein the initial storage region securing step secures, as the initial compressed image storage region in the image storage device, a storage region having a data size corresponding to the product of an expected divided image data amount multiplied by a division number, the expected divided image data amount being an expected data amount of the division unit of the compressed image data, and the division number being a number obtained by dividing the input image data by the division unit, and
wherein the monitoring step monitors, for the individual division unit of the image area separation data, the data amount of the division unit of the compressed image data, and
wherein, upon determination that the data amount of the division unit of the compressed image data has reached or exceeded the expected divided image data amount, the additional storage region securing step secures, as the additional storage region in the image storage device, a storage region having a data size corresponding to the data amount by which the data amount of the division unit of the compressed image data has exceeded the expected divided image data amount.

9. The image processing method according to claim 8, further comprising:
outputting the image area separation data to the data; and
outputting an image area block output notification at every output of the division unit of the image area separation data,
wherein the image data compression step outputs an image block output notification at every output of the division unit of the compressed image data, and
wherein, based on the number of the image block output notifications for the individual image area block output notification, the monitoring step monitors, for the individual division unit of the image area separation data, the data amount of the division unit of the compressed image data.

10. The image processing method according to claim 8, further comprising a division unit setting step of arbitrarily setting the division unit.

11. The image processing method according to claim 7, further comprising:
using at least the compressed image data stored in the image storage device,
wherein the monitoring step further comprises reporting the start of compression of the image data and storage of the compressed image data in the image storage device based on results of the monitoring of the compressed image data amount obtained in the monitoring step.

12. The image processing method according to claim 7, further comprising:
an image area separation data compression step of compressing image area separation data temporarily stored in the image area storage device.

13. A non-transitory computer-readable storage medium storing program codes that cause a computer to execute a method of processing an image, the method comprising:
separating input image data into image data and image area separation data;
compressing the image data in accordance with a compression method;
storing the image area separation data in an image area storage device;
securing an initial compressed image storage region of a predetermined data size in an image storage device;
sequentially storing the compressed image data in the initial compressed image storage region;
monitoring a compressed image data amount; and
securing an additional storage region in the image storage device upon determination that the compressed image data amount has reached or exceeded a data amount storable in the initial compressed image storage region.

* * * * *